United States Patent
Godevais et al.

(10) Patent No.: US 7,205,067 B2
(45) Date of Patent: Apr. 17, 2007

(54) METHOD AND APPARATUS FOR DISSIPATION OF HEAT GENERATED BY A SECONDARY ELECTROCHEMICAL CELL

(75) Inventors: Stephan Godevais, Austin, TX (US); Joe Lamoreux, Austin, TX (US); Larry Stone, Austin, TX (US)

(73) Assignee: Valence Technology, Inc., Las Vegas, NV (US)

( * ) Notice: Subject to any disclaimer, the term of this patent is extended or adjusted under 35 U.S.C. 154(b) by 0 days.

(21) Appl. No.: 11/338,461

(22) Filed: Jan. 24, 2006

(65) Prior Publication Data

US 2006/0177738 A1  Aug. 10, 2006

Related U.S. Application Data

(60) Provisional application No. 60/593,717, filed on Feb. 8, 2005.

(51) Int. Cl.
*H01M 10/50* (2006.01)
*H01M 4/58* (2006.01)

(52) U.S. Cl. ............... 429/120; 429/218.1; 429/231.5; 429/231.95

(58) Field of Classification Search ............. 429/231.9, 429/231.95, 120, 231.5, 221, 224, 223, 231.6, 429/225

See application file for complete search history.

(56) References Cited

U.S. PATENT DOCUMENTS

| | | | |
|---|---|---|---|
| 5,158,841 A | 10/1992 | Minnicke et al. | |
| 5,224,356 A | 7/1993 | Colvin et al. | |
| 5,272,491 A | 12/1993 | Asakawa et al. | |
| 5,449,571 A | 9/1995 | Longardner et al. | |
| 5,578,393 A | 11/1996 | Haskins | |
| 5,871,866 A | 2/1999 | Barker et al. | |
| 5,910,382 A | 6/1999 | Goodenough et al. | |
| 5,993,997 A * | 11/1999 | Fujimoto et al. | 429/231.8 |
| 6,085,015 A | 7/2000 | Armand et al. | |
| 6,136,472 A | 10/2000 | Barker et al. | |
| 6,153,333 A | 11/2000 | Barker | |
| 6,190,803 B1 * | 2/2001 | Tomiyama et al. | 429/245 |
| 6,203,946 B1 | 3/2001 | Barker et al. | |
| 6,387,568 B1 | 5/2002 | Barker et al. | |
| 6,391,493 B1 | 5/2002 | Goodenough et al. | |
| 6,468,689 B1 | 10/2002 | Hallaj et al. | |
| 6,514,640 B1 | 2/2003 | Armand et al. | |
| 2002/0039687 A1 | 4/2002 | Barker et al. | |
| 2002/0086214 A1 | 7/2002 | Barker et al. | |
| 2002/0168573 A1 | 11/2002 | Barker et al. | |
| 2002/0192553 A1 | 12/2002 | Barker et al. | |
| 2002/0195591 A1 | 12/2002 | Ravet et al. | |
| 2003/0013019 A1 | 1/2003 | Barker et al. | |
| 2003/0027049 A1 | 2/2003 | Barker et al. | |
| 2003/0077514 A1 | 4/2003 | Barker et al. | |

(Continued)

*Primary Examiner*—Jill Warden
*Assistant Examiner*—Thomas H. Parsons
(74) *Attorney, Agent, or Firm*—Michael D. Ross; Roger A. Williams; Cynthia S. Kovacevic (57) ABSTRACT

The invention provides an electrochemical cell which includes a first electrode and a second electrode which is a counter electrode to the first electrode, and an electrolyte. The first electrode includes a polyanion-based electrode active material. The electrochemical cell is in a heat transfer relationship with a heat dissipation subassembly containing one or more passive heat sinks for dissipating heat generated by the cell.

36 Claims, 9 Drawing Sheets

U.S. PATENT DOCUMENTS

| | | |
|---|---|---|
| 2003/0082446 A1 | 5/2003 | Chiang et al. |
| 2003/0082454 A1 | 5/2003 | Armand et al. |
| 2003/0099884 A1 | 5/2003 | Chiang et al. |
| 2003/0129492 A1 | 7/2003 | Barker et al. |
| 2003/0170542 A1 | 9/2003 | Barker et al. |
| 2003/0190526 A1 | 10/2003 | Saidi et al. |
| 2003/0190527 A1 | 10/2003 | Pugh et al. |
| 2003/0190528 A1 | 10/2003 | Saidi et al. |
| 2003/0215714 A1 | 11/2003 | Barker et al. |
| 2003/0215715 A1 | 11/2003 | Barker et al. |
| 2004/0005265 A1 | 1/2004 | Chiang et al. |
| 2004/0018430 A1 | 1/2004 | Chiang et al. |
| 2004/0033360 A1 | 2/2004 | Armand et al. |
| 2004/0086445 A1 | 5/2004 | Armand et al. |
| 2005/0034993 A1 | 2/2005 | Chiang et al. |
| 2005/0233219 A1 | 10/2005 | Chiang et al. |

* cited by examiner

METHOD AND APPARATUS FOR DISSIPATION OF HEAT GENERATED BY A SECONDARY ELECTROCHEMICAL CELL

This Application claims the benefit of U.S. Ser. No. 60/593,717, filed Feb. 8, 2005.

FIELD OF THE INVENTION

This invention relates to a method and apparatus for dissipating heat generated by an electrochemical cell employing a non-aqueous electrolyte and a polyanion-based electrode active material.

BACKGROUND OF THE INVENTION

A battery pack consists of one or more electrochemical cells or batteries, wherein each cell typically includes a positive electrode, a negative electrode, and an electrolyte or other material for facilitating movement of ionic charge carriers between the negative electrode and positive electrode. As the cell is charged, cations migrate from the positive electrode to the electrolyte and, concurrently, from the electrolyte to the negative electrode. During discharge, cations migrate from the negative electrode to the electrolyte and, concurrently, from the electrolyte to the positive electrode.

Such batteries generally include an electrochemically active material having a crystal lattice structure or framework from which ions can be extracted and subsequently reinserted, and/or permit ions to be inserted or intercalated and subsequently extracted.

Recently, three-dimensionally structured compounds comprising polyanions (e.g., $(SO_4)^{n-}$, $(PO_4)^{n-}$, $(AsO_4)^{n-}$, and the like), have been devised as viable alternatives to oxide-based electrode materials such as $LiM_xO_y$, wherein M is a transition metal such as cobalt (Co). These polyanion-based compounds exhibit electrochemical and safety characteristics over other electrode active materials commercially available today.

However, electrochemical cells employing such polyanion-based compounds often suffer from poor performance and further still, failure, due to the deleterious effects caused by heat generated within the cell during charge and discharge. Such deleterious effects are especially acute when the cell is charge and discharged at high rates. Accordingly, there is a current need for a method and apparatus for dissipating heat generated in secondary electrochemical cells containing polyanion-based electrode active materials.

SUMMARY OF THE INVENTION

The present invention provides a novel secondary electrochemical cell having an electrode active material represented by the nominal general formula:

$$A_aM_m(XY_4)_cZ_e,$$

wherein:
A. A is selected from the group consisting of elements from Group I of the Periodic Table, and mixtures thereof, and $0 < a \leq 9$;
B. M includes at least one redox active element, and $1 \leq m \leq 3$;
C. $XY_4$ is selected from the group consisting of $X'[O_{4-x}, Y'_x]$, $X'[O_{4-y}, Y'_{2y}]$, $X''S_4$, $[X,''',X'_{1-z}]O_4$, and mixtures thereof, wherein:

1. X' and X''' are each independently selected from the group consisting of P, As, Sb, Si, Ge, V, S, and mixtures thereof;
2. X'' is selected from the group consisting of P, As, Sb, Si, Ge, V, and mixtures thereof;
3. Y' is selected from the group consisting of a halogen, S, N, and mixtures thereof; and
4. $0 \leq x \leq 3$, $0 \leq y \leq 2$, $0 \leq z \leq 1$, and $0 \leq c \leq 3$; and D. Z is selected from the group consisting of a hydroxyl (OH), a halogen selected from Group 17 of the Periodic Table, and mixtures thereof, and $0 \leq e \leq 4$;

wherein A, M, X, Y, Z, a, m, x, y, z, and e are selected so as to maintain electroneutrality of the material.

In one embodiment, the secondary electrochemical cell is a cylindrical cell having a spirally coiled or wound electrode assembly enclosed in a cylindrical casing. In an alternate embodiment, the secondary electrochemical cell is a prismatic cell having a jellyroll-type electrode assembly enclosed in a cylindrical casing having a substantially rectangular cross-section.

In each embodiment described herein, the electrode assembly includes a separator interposed between a first electrode (positive electrode) and a counter second electrode (negative electrode), for electrically insulating the first electrode from the second electrode. A non-aqueous electrolyte is provided for transferring ionic charge carriers between the first electrode and the second electrode during charge and discharge of the electrochemical cell.

The electrochemical cell is in a heat transfer relationship with a heat dissipation subassembly containing one or more passive heat sinks for dissipating heat generated by the cell.

DETAILED DESCRIPTION OF THE PREFERRED EMBODIMENTS

It has been found that the novel electrochemical cells of this invention afford benefits over such materials and devices among those known in the art. Such benefits include, without limitation, one or more of increased capacity, enhanced cycling capability, enhanced reversibility, enhanced ionic conductivity, enhanced electrical conductivity, enhanced rate capability, and reduced costs. Specific benefits and embodiments of the present invention are apparent from the detailed description set forth herein below. It should be understood, however, that the detailed description and specific examples, while indicating embodiments among those preferred, are intended for purposes of illustration only and are not intended to limit the scope of the invention.

Figure 1:
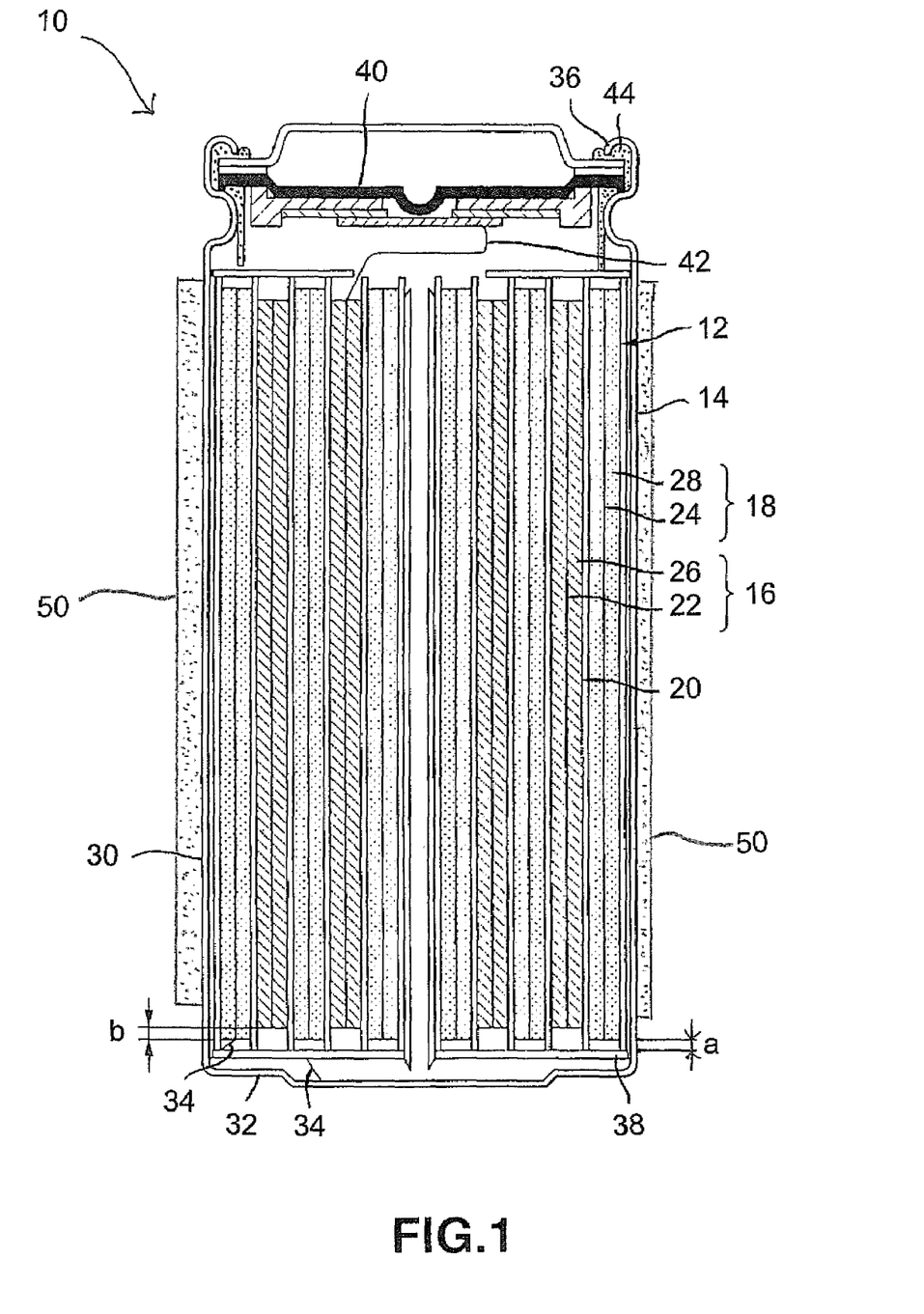
FIG. 1 is a schematic cross-sectional diagram illustrating the structure of a non-aqueous electrolyte cylindrical electrochemical cell of the present invention.

Referring to FIG. 1, a secondary electrochemical cell 10 having an electrode active material described herein below as general formula (I), is illustrated. The cell 10 includes a spirally coiled or wound electrode assembly 12 enclosed in a sealed container, preferably a rigid cylindrical casing 14. The electrode assembly 12 includes: a positive electrode 16 consisting of, among other things, an electrode active material described herein below; a counter negative electrode 18; and a separator 20 interposed between the first and second electrodes 16,18. The separator 20 is preferably an electrically insulating, ionically conductive microporous film, and composed of a polymeric material selected from the group consisting of polyethylene, polyethylene oxide, polyacrylonitrile and polyvinylidene fluoride, polymethyl methacrylate, polysiloxane, copolymers thereof, and admixtures thereof.

Each electrode 16,18 includes a current collector 22 and 24, respectively, for providing electrical communication between the electrodes 16,18 and an external load. Each current. collector 22,24 is a foil or grid of an electrically conductive metal such as iron, copper, aluminum, titanium, nickel, stainless steel, or the like, having a thickness of between 5 µm and 100 µm, preferably 5 µm and 20 µm. Optionally, the current collector may be treated with an oxide-removing agent such as a mild acid and the like, and coated with an electrically conductive coating for inhibiting the formation of electrically insulating oxides on the surface of the current collector 22,24. Examples of suitable coatings include polymeric materials comprising a homogenously dispersed electrically conductive material (e.g. carbon), such polymeric materials including: acrylics including acrylic acid and methacrylic acids and esters, including poly (ethylene-co-acrylic acid); vinylic materials including poly(vinyl acetate) and poly(vinylidene fluoride-co-hexafluoropropylene); polyesters including poly(adipic acid-co-ethylene glycol); polyurethanes; fluoroelastomers; and mixtures thereof.

The positive electrode 16 further includes a positive electrode film 26 formed on at least one side of the positive electrode current collector 22, preferably both sides of the positive electrode current collector 22, each film 26 having a thickness of between 10 µm and 150 µm, preferably between 25 µm an 125 µm, in order to realize the optimal capacity for the cell 10. The positive electrode film 26 is preferably composed of between 80% and 99% by weight of an electrode active material described herein below as general formula (I), between 1% and 10% by weight binder, and between 1% and 10% by weight electrically conductive agent.

Suitable binders include: polyacrylic acid; carboxymethylcellulose; diacetylcellulose; hydroxypropylcellulose; polyethylene; polypropylene; ethylene-propylene-diene copolymer; polytetrafluoroethylene; polyvinylidene fluoride; styrene-butadiene rubber; tetrafluoroethylene-hexafluoropropylene copolymer; polyvinyl alcohol; polyvinyl chloride; polyvinyl pyrrolidone; tetrafluoroethylene-perfluoroalkylvinyl ether copolymer; vinylidene fluoride-hexafluoropropylene copolymer; vinylidene fluoride-chlorotrifluoroethylene copolymer; ethylenetetrafluoroethylene copolymer; polychlorotrifluoroethylene; vinylidene fluoride-pentafluoropropylene copolymer; propylene-tetrafluoroethylene copolymer; ethylene-chlorotrifluoroethylene copolymer; vinylidene fluoride-hexafluoropropylene-tetrafluoroethylene copolymer; vinylidene fluoride-perfluoromethylvinyl ether-tetrafluoroethylene copolymer; ethylene-acrylic acid copolymer; ethylene-methacrylic acid copolymer; ethylene-methyl acrylate copolymer; ethylene-methyl methacrylate copolymer; styrene-butadiene rubber; fluorinated rubber; polybutadiene; and admixtures thereof. Of these materials, most preferred are polyvinylidene fluoride and polytetrafluoroethylene.

Suitable electrically conductive agents include: natural graphite (e.g. flaky graphite, and the like); manufactured graphite; carbon blacks such as acetylene black, Ketzen black, channel black, furnace black, lamp black, thermal black, and the like; conductive fibers such as carbon fibers and metallic fibers; metal powders such as carbon fluoride, copper, nickel, and the like; and organic conductive materials such as polyphenylene derivatives.

The negative electrode 18 is formed of a negative electrode film 28 formed on at least one side of the negative electrode current collector 24, preferably both sides of the negative electrode current collector 24. The negative electrode film 28 is composed of between 80% and 95% of an intercalation material, between 2% and 10% by weight binder, and (optionally) between 1% and 10% by of an weight electrically conductive agent.

Intercalation materials suitable herein include: transition metal oxides, metal chalcogenides, carbons (e.g. graphite), and mixtures thereof. In one embodiment, the intercalation material is selected from the group consisting of crystalline graphite and amorphous graphite, and mixtures thereof, each such graphite having one or more of the following properties: a lattice interplane (002) d-value ($d_{(002)}$) obtained by X-ray diffraction of between 3.35 Å to 3.34 Å, inclusive (3.35 Å $\leq d_{(002)} \leq$ 3.34 Å), preferably 3.354 Å to 3.370 Å, inclusive (3.354 Å $\leq d_{(002)} \leq$ 3.370 Å; a crystallite size ($L_c$) in the c-axis direction obtained by X-ray diffraction of at least 200 Å, inclusive ($L_c \geq$ 200 Å), preferably between 200 Å and 1,000 Å, inclusive (200 Å $\leq L_c \leq$ 1,000 Å); an average particle diameter ($P_d$) of between 1 µm to 30 µm, inclusive (1 µm $\leq P_d \leq$ 30 µm); a specific surface (SA) area of between 0.5 $m^2/g$ to 50 $m^2/g$, inclusive (0.5 $m^2/g \leq$ SA $\leq$ 50 $m^2/g$); and a true density (ρ) of between 1.9 $g/cm^3$ to 2.25 $g/cm^3$, inclusive (1.9 $g/cm^3 \leq \rho \leq$ 2.25 $g/cm^3$).

Referring again to FIG. 1, to ensure that the electrodes 16,18 do not come into electrical contact with one another, in the event the electrodes 16,18 become offset during the winding operation during manufacture, the separator 20 "overhangs" or extends a width "a" beyond each edge of the negative electrode 18. In one embodiment, 50 µm $\leq$ a $\leq$ 2,000 µm. To ensure alkali metal does not plate on the edges of the negative electrode 18 during charging, the negative electrode 18 "overhangs" or extends a width "b" beyond each edge of the positive electrode 16. In one embodiment, 50 µm $\leq$ b $\leq$ 2,000 µm.

The cylindrical casing 14 includes a cylindrical body member 30 having a closed end 32 in electrical communication with the negative electrode 18 via a negative electrode lead 34, and an open end defined by crimped edge 36. In operation, the cylindrical body member 30, and more particularly the closed end 32, is electrically conductive and provides electrical communication between the negative electrode 18 and an external load (not illustrated). An insulating member 38 is interposed between the spirally coiled or wound electrode assembly 12 and the closed end 32.

A positive terminal subassembly 40 in electrical communication with the positive electrode 16 via a positive electrode lead 42 provides electrical communication between the positive electrode 16 and the external load (not illustrated). Preferably, the positive terminal subassembly 40 is adapted to sever electrical communication between the positive electrode 16 and an external load/charging device in the event of an overcharge condition (e.g. by way of positive temperature coefficient (PTC) element), elevated temperature and/or in the event of excess gas generation within the cylindrical casing 14. Suitable positive terminal assemblies 40 are disclosed in U.S. Pat. No. 6,632,572 to Iwaizono, et aL, issued Oct. 14, 2003; and U.S. Pat. No. 6,667,132 to Okochi, et aL, issued Dec. 23, 2003. A gasket member 44 sealingly engages the upper portion of the cylindrical body member 30 to the positive terminal subassembly 40.

A non-aqueous electrolyte (not shown) is provided for transferring ionic charge carriers between the positive electrode 16 and the negative electrode 18 during charge and discharge of the electrochemical cell 10. The electrolyte includes a non-aqueous solvent and an alkali metal salt dissolved therein. Suitable solvents include: a cyclic carbonate such as ethylene carbonate, propylene carbonate, butylene carbonate or vinylene carbonate; a non-cyclic carbonate such as dimethyl carbonate, diethyl carbonate, ethyl methyl carbonate or dipropyl carbonate; an aliphatic carboxylic acid ester such as methyl formate, methyl acetate, methyl propionate or ethyl propionate; a .gamma.-lactone such as γ-butyrolactone; a non-cyclic ether such as 1,2-dimethoxyethane, 1,2-diethoxyethane or ethoxymethoxyethane; a cyclic ether such as tetrahydrofuran or 2-methyltetrahydrofuran; an organic aprotic solvent such as dimethylsulfoxide, 1,3-dioxolane, formamide, acetamide, dimethylformamide, dioxolane, acetonitrile, propylnitrile, nitromethane, ethyl monoglyme, phospheric acid triester, trimethoxymethane, a dioxolane derivative, sulfolane, methylsulfolane, 1,3-dimethyl-2-imidazolidinone, 3-methyl-2-oxazolidinone a propylene carbonate derivative, a tetrahydrofuran derivative, ethyl ether, 1,3-propanesultone, anisole, dimethylsulfoxide and N-methylpyrrolidone; and mixtures thereof. A mixture of a cyclic carbonate and a non-cyclic carbonate or a mixture of a cyclic carbonate, a non-cyclic carbonate and an aliphatic carboxylic acid ester, are preferred.

Suitable alkali metal salts, particularly lithium salts, include: $LiClO_4$; $LiBF_4$; $LiPF_6$; $LiAlCl_4$; $LiSbF_6$; LiSCN; LiCl; $LiCF_3SO_3$; $LiCF_3CO_2$; $Li(CF_3SO_2)_2$; $LiAsF_6$; $LiN(CF_3SO2)_2$; $LiB_{10}Cl_{10}$; a lithium lower aliphatic carboxylate; LiCl; LiBr; LiI; a chloroboran of lithium; lithium tetraphenylborate; lithium imides; and mixtures thereof. Preferably, the electrolyte contains at least $LiPF_6$.

Referring again to FIG. 1, a phase change-assisted passive heat sink 50 in heat transfer relationship with one or more secondary electrochemical cells 10, is provided for dissipating heat generated by the cell(s) 10. The passive heat sink 50 includes an endothermic phase change material that undergoes a softening or endothermic phase change (and/or dehydration) as a result of absorbing heat dissipated by the cell(s) 10 during operation (e.g., during cycling and float conditions). The phase change material should exhibit a softening or endothermic phase change at a temperature that is greater than the ambient temperature of the cell(s) 10 when not in operation, and is less than the greatest internal temperature of the cell(s) 10 during operation (e.g. during cycling and float). Selection of the particular phase change material will depend on such factors as cell construction and materials employed to construct the cell 10, and the manner in which the cell 10 is cycled (e.g. rate), which, in turn, will determine the temperature(s) of operation of the cell 10.

Suitable organic endothermic phase change materials useful with the present invention include: $C_{12}$–$C_{16}$ alcohols, acids, and esters; waxes; low molecular weight styrenes; methyl triphenyl silane materials; and combinations thereof. Suitable $C_{12}$–$C_{16}$ acids and alcohols include myristyl alcohol, cetyl alcohol, stearyl alcohol, myristyl acid, and stearic acid. Preferred waxes include highly- and semi-crystalline wax, paraffin waxes, uncrosslinked organofunctional silicone wax, and other wax-like compounds, such as cyclopentane, heceicosyl; 2-heptadecanone; pentacosaneyl; silicic acid, tetraphenyl ester; octadecanoic acid; 2-[2-[2-(2hydroxyethoxy) ethoxy] ethoxy] ethyl ester; cyclohexane, docosyl; polystyrene; polyamide resins; disiloxane 1,1,1, trimethyl-3,3; and triphenyl silane.

Alternatively, the particulate material may be inorganic, or a mixture of organic and inorganic endothermic phase change materials. Inorganic endothermic phase change materials suitable for use with present invention include: sodium thiosulfate pentahydrate; sodium acetate trihydrate; sodium sulfate decahydrate; sodium carbonate; barium hydroxide; calcium chloride; nickel nitrate tetrahydrate; zinc nitrate hexahydrate; and mixtures thereof.

In one embodiment, phase change material is encapsulated by a polymer material. Suitable polymers include single or multi-component elastomers, consisting of one or more of the following: silicone, acrylic, natural rubber, synthetic rubber, or other appropriate elastomeric materials. Examples of such elastomers include styrene butadiene rubbers, both di-block and tri-block elastomers, nitrile, natural rubber, polyester resins, combinations thereof, and the like.

In another embodiment, the phase change-assisted passive heat sink 50 includes a thermally conductive filler for increasing the thermal conductivity of the heat sink 50. Examples of suitable conductive fillers include, but are not limited to: metals, metal oxides and combinations thereof. Particular conductive fillers suitable for use with the present invention include aluminum nitride; aluminum oxide; barium titanate; beryllium oxide; boron nitride; diamond; graphite; magnesium oxide; metal particulate such as copper, gold, nickel, or silver; silicon carbide; tungsten carbide; zinc oxide; and combinations thereof. Preferably, the particle size of the filler, the particle size distribution, and filler loading (concentration in the film) are selected to maximize packing and thus produce the most efficient thermal conductance. Preferably, the particle size of the filler is between about 2 and 100 microns.

In one embodiment, the heat sink 50 envelopes or encapsulates the entire cylindrical body member 30. In another embodiment, the heat sink 50 may envelope or encapsulate the entire cell 10, where the positive and negative leads (not illustrated) are attached to the positive electrode assembly 40 and the negative closed end 32, respectively.

As noted herein above, the positive electrode film 26 is composed of an electrode active material represented by the nominal general formula (I):

$$A_a M_m (XY_4)_c Z_e. \qquad (I)$$

The term "nominal general formula" refers to the fact that the relative proportion of atomic species may vary slightly on the order of 2 percent to 5 percent, or more typically, 1 percent to 3 percent. The composition of A, M, $XY_4$ and Z of general formula (I), as well as the stoichiometric values of the elements of the active material, are selected so as to maintain electroneutrality of the electrode active material. The stoichiometric values of one or more elements of the composition may take on non-integer values.

For all embodiments described herein, A is selected from the group consisting of elements from Group I of the Periodic Table, and mixtures thereof (e.g. $A_a=A_{a-a'}A'_{a'}$, wherein A and A' are each selected from the group consisting of elements from Group I of the Periodic Table and are different from one another, and a'<a). As referred to herein, "Group" refers to the Group numbers (i.e., columns) of the Periodic Table as defined in the current IUPAC Periodic Table. (See, e.g., U.S. Pat. No. 6,136,472, Barker et al., issued Oct. 24, 2000, incorporated by reference herein.) In addition, the recitation of a genus of elements, materials or other components, from which an individual component or mixture of components can be selected, is intended to include all possible sub-generic combinations of the listed components, and mixtures thereof.

In one embodiment, A is selected from the group consisting of Li (Lithium), Na (Sodium), K (Potassium), and mixtures thereof. A may be mixture of Li with Na, a mixture of Li with K, or a mixture of Li, Na and K. In another embodiment, A is Na, or a mixture of Na with K. In one preferred embodiment, A is Li.

A sufficient quantity (a) of moiety A should be present so as to allow all of the "redox active" elements of moiety M (as defined herein below) to undergo oxidation/reduction. In one embodiment, $0<a\leq 9$. In another embodiment, $3\leq a\leq 5$. In another embodiment, $3<a\leq 5$. Unless otherwise specified, a variable described herein algebraically as equal to ("="), less than or equal to ("$\leq$"), or greater than or equal to ("$\geq$") a number is intended to subsume values or ranges of values about equal or functionally equivalent to said number.

Removal of an amount of A from the electrode active material is accompanied by a change in oxidation state of at least one of the "redox active" elements in the active material, as defined herein below. The amount of redox active material available for oxidation/reduction in the active material determines the amount (a) of the moiety A that may be removed. Such concepts are, in general application, well known in the art, e.g., as disclosed in U.S. Pat. No. 4,477,541, Fraioli, issued Oct. 16, 1984; and U.S. Pat. No. 6,136,472, Barker, et al., issued Oct. 24, 2000, both of which are incorporated by reference herein.

In general, the amount (a) of moiety A in the active material varies during charge/discharge. Where the active materials of the present invention are synthesized for use in preparing an alkali metal-ion battery in a discharged state, such active materials are characterized by a relatively high value of "a", with a correspondingly low oxidation state of the redox active components of the active material. As the electrochemical cell is charged from its initial uncharged state, an amount (b) of moiety A is removed from the active material as described above. The resulting structure, containing less amount of the moiety A (i.e., a-b) than in the as-prepared state, and at least one of the redox active components having a higher oxidation state than in the as-prepared state, while essentially maintaining the original stoichiometric values of the remaining components (e.g. M, X, Y and Z). The active materials of this invention include such materials in their nascent state (i.e., as manufactured prior to inclusion in an electrode) and materials formed during operation of the battery (i.e., by insertion or removal of A).

For all embodiments described herein, moiety A may be partially substituted by moiety D by aliovalent or isocharge substitution, in equal or unequal stoichiometric amounts, wherein:

1. $A_a=[A_{a-(fV_A)}, D_{(d/V_D)}]$,
2. $V^A$ is the oxidation state of moiety A (or sum of oxidation states of the elements consisting of the moiety A), and $V^D$ is the oxidation state of moiety D;
3. $V^A=V^D$ or $V^A \neq V^D$;
4. f=d or f≠d; and
5. f,d<0 and f≤a.

"Isocharge substitution" refers to a substitution of one element on a given crystallographic site with an element having the same oxidation state (e.g. substitution of $Ca^{2+}$ with $Mg^{2+}$). "Aliovalent substitution" refers to a substitution of one element on a given crystallographic site with an element of a different oxidation state (e.g. substitution of $Li^+$ with $Mg^{2+}$).

Moiety D is at least one element preferably having an atomic radius substantially comparable to that of the moiety being substituted (e.g. moiety M and/or moiety A). In one embodiment, D is at least one transition metal. Examples of transition metals useful herein with respect to moiety D include, without limitation, Nb (Niobium), Zr (Zirconium), Ti (Titanium), Ta (Tantalum), Mo (Molybdenum), W (Tungsten), and mixtures thereof. In another embodiment, moiety D is at least one element characterized as having a valence state of ≥2+ and an atomic radius that is substantially comparable to that of the moiety being substituted (e.g. M and/or A). With respect to moiety A, examples of such elements include, without limitation, Nb (Niobium), Mg (Magnesium) and Zr (Zirconium). Preferably, the valence or oxidation state of D ($V^D$) is greater than the valence or oxidation state of the moiety (or sum of oxidation states of the elements consisting of the moiety) being substituted for by moiety D (e.g. moiety M and/or moiety A).

For all embodiments described herein where moiety A is partially substituted by moiety D by isocharge substitution, A may be substituted by an equal stoichiometric amount of moiety D, wherein f,d>0, f≤a, and f=d.

Where moiety A is partially substituted by moiety D by isocharge substitution and d≠f, then the stoichiometric amount of one or more of the other components (e.g. A, M, $XY_4$ and Z) in the active material must be adjusted in order to maintain electroneutrality.

For all embodiments described herein where moiety A is partially substituted by moiety D by aliovalent substitution, moiety A may be substituted by an "oxidatively" equivalent amount of moiety D, wherein: f=d; f,d<0; and f≤a.

Where moiety is partially substituted by moiety D by aliovalent substitution and d≠f, then the stoichiometric amount of one or more of the other components (e.g. A, M, $XY_4$ and Z) in the active material must be adjusted in order to maintain electroneutrality.

Referring again to general formula (I), in all embodiments described herein, moiety M is at least one redox active element. As used herein, the term "redox active element" includes those elements characterized as being capable of undergoing oxidation/reduction to another oxidation state when the electrochemical cell is operating under normal operating conditions. As used herein, the term "normal operating conditions" refers to the intended voltage at which the cell is charged, which, in turn, depends on the materials used to construct the cell.

Redox active elements useful herein with respect to moiety M include, without limitation, elements from Groups 4 through 11 of the Periodic Table, as well as select non-transition metals, including, without limitation, Ti (Titanium), V (Vanadium), Cr (Chromium), Mn (Manganese), Fe (Iron), Co (Cobalt), Ni (Nickel), Cu (Copper), Nb (Niobium), Mo (Molybdenum), Ru (Ruthenium), Rh (Rhodium), Pd (Palladium), Os (Osmium), Ir (Iridium), Pt (Platinum), Au (Gold), Si (Silicon), Sn (Tin), Pb (Lead), and mixtures thereof. For each embodiment described herein, M may comprise a mixture of oxidation states for the selected element (e.g., M=$Mn^{2+}Mn^{4+}$). Also, "include," and its variants, is intended to be non-limiting, such that recitation of items in a list is not to the exclusion of other like items that may also be useful in the materials, compositions, devices, and methods of this invention.

In one embodiment, moiety M is a redox active element. In one subembodiment, M is a redox active element selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, and $Pb^{2+}$. In another subembodiment, M is a redox active element selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, and $Nb^{3+}$.

In another embodiment, moiety M includes one or more redox active elements and (optionally) one or more non-redox active elements. As referred to herein, "non-redox active elements" include elements that are capable of forming stable active materials, and do not undergo oxidation/reduction when the electrode active material is operating under normal operating conditions.

Among the non-redox active elements useful herein include, without limitation, those selected from Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd (Neodymium), Sm (Samarium); Group 12 elements, particularly Zn (Zinc) and Cd (Cadmium); Group 13 elements, particularly B (Boron), Al (Aluminum), Ga (Gallium), In (Indium), Tl (Thallium); Group 14 elements, particularly C (Carbon) and Ge (Germanium), Group 15 elements, particularly As (Arsenic), Sb (Antimony), and Bi (Bismuth); Group 16 elements, particularly Te (Tellurium); and mixtures thereof.

In one embodiment, M=$MI_nMII_o$, wherein $0<o+n\leq 3$ and each of o and n is greater than zero ($0<o,n$), wherein MI and MII are each independently selected from the group consisting of redox active elements and non-redox active elements, wherein at least one of MI and MII is redox active. MI may be partially substituted with MII by isocharge or aliovalent substitution, in equal or unequal stoichiometric amounts.

For all embodiments described herein where MI is partially substituted by MII by isocharge substitution, MI may be substituted by an equal stoichiometric amount of MII, whereby M=$MI_{n-o}MII_o$. Where MI is partially substituted by MII by isocharge substitution and the stoichiometric amount of MI is not equal to the amount of MII, whereby M=$MI_oMII_p$ and $o \neq p$, then the stoichiometric amount of one or more of the other components (e.g. A, D, $XY_4$ and Z) in the active material must be adjusted in order to maintain electroneutrality.

For all embodiments described herein where MI is partially substituted by MII by aliovalent substitution and an equal amount of MI is substituted by an equal amount of MII, whereby M=$MI_{n-o}MII_o$, then the stoichiometric amount of one or more of the other components (e.g. A, D, $XY_4$ and Z) in the active material must be adjusted in order to maintain electroneutrality. However, MI may be partially substituted by MII by aliovalent substitution by substituting an "oxidatively" equivalent amount of MII for MI, whereby M=$MI_{n-(o/V^{MI})}MII_{(o/V^{MII})}$, wherein $V^{MI}$ is the oxidation state of MI, and $V_{MII}$ is the oxidation state of MII.

In one subembodiment, MI is selected from the group consisting of Ti, V, Cr, Mn, Fe, Co, Ni, Cu, Mo, Si, Pb, Mo, Nb, and mixtures thereof, and MII is selected from the group consisting of Be, Mg, Ca, Sr, Ba, Sc, Y, Zn, Cd, B, Al, Ga, In, C, Ge, and mixtures thereof. In this subembodiment, MI may be substituted by MII by isocharge substitution or aliovalent substitution.

In another subembodiment, MI is partially substituted by MII by isocharge substitution. In one aspect of this subembodiment, MI is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof, and MII is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof. In another aspect of this subembodiment, MI is selected from the group specified immediately above, and MII is selected from the group consisting of $Be^{2+}$, $Mg^{2+}$, $Ca^{2+}$, $Sr^{2+}$, $Ba^{2+}$, and mixtures thereof. In another aspect of this subembodiment, MI is selected from the group specified above, and MII is selected from the group consisting of $Zn^{2+}$, $Cd^{2+}$, and mixtures thereof. In yet another aspect of this subembodiment, MI is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof, and MII is selected from the group consisting of $Sc^{3+}$, $Y^{3+}$, $B^{3+}$, $Al^{3+}$, $Ga^{3+}$, $In^{3+}$, and mixtures thereof.

In another embodiment, MI is partially substituted by MII by aliovalent substitution. In one aspect of this subembodiment, MI is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof, and MII is selected from the group consisting of $Sc^{3+}$, $Y^{3+}$, $B^{3+}$, $Al^{3+}$, $Ga^{3+}$, $In^{3+}$, and mixtures thereof. In another aspect of this subembodiment, MI is a 2+ oxidation state redox active element selected from the group specified immediately above, and MII is selected from the group consisting of alkali metals, $Cu^{1+}$, $Ag^{1+}$ and mixtures thereof. In another aspect of this subembodiment, MI is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof, and MII is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof. In another aspect of this subembodiment, MI is a 3+ oxidation state redox active element selected from the group specified immediately above, and MII is selected from the group consisting of alkali metals, $Cu^{1+}$, $Ag^{1+}$ and mixtures thereof.

In another embodiment, M=$M1_qM2_rM3_s$, wherein:

1. M1 is a redox active element with a 2+ oxidation state;
2. M2 is selected from the group consisting of redox and non-redox active elements with a 1+ oxidation state;
3. M3 is selected from the group consisting of redox and non-redox active elements with a 3+ or greater oxidation state; and
4. at least one of q, r and s is greater than 0, and at least one of M1, M2, and M3 is redox active.

In one subembodiment, M1 is substituted by an equal amount of M2 and/or M3, whereby $q=q-(r+s)$. In this subembodiment, then the stoichiometric amount of one or more of the other components (e.g. A, $XY_4$, Z) in the active material must be adjusted in order to maintain electroneutrality.

In another subembodiment, M1 is substituted by an "oxidatively" equivalent amount of M2 and/or M3, whereby M=$M1_{q-(r/V^{M1})-(s/M1)}M2_{(r/V^{M2})}M3_{(s/V^{M3})}$, wherein $V^{M1}$ is the oxidation state of M1, $V^{M2}$ is the oxidation state of M2, and $V^{M3}$ is the oxidation state of M3.

In one subembodiment, M1 is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof; M2 is selected from the group consisting of $Cu^{1+}$, $Ag^{1+}$ and mixtures thereof; and M3 is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof. In another subembodiment, M1 and M3 are selected from their respective preceding groups, and M2 is selected from the group consisting of $Li^{1+}$, $K^{1+}$, $Na^{1+}$, $Ru^{1+}$, $Cs^{1+}$, and mixtures thereof.

In another subembodiment, M1 is selected from the group consisting of $Be^{2+}$, $Mg^{2+}$, $Ca^{2+}$, $Sr^{2+}$, $Ba^{2+}$, $Zn^{2+}$, $Cd^{2+}$, $Ge^{2+}$, and mixtures thereof; M2 is selected from the group consisting of $Cu^{1+}$, $Ag^{1+}$ and mixtures thereof; and M3 is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof. In another subembodiment, M1 and M3 are selected from their respective preceding groups, and M2 is selected from the group consisting of $Li^{1+}$, $K^{1+}$, $Na^{1+}$, $Ru^{1+}$, $Cs^{1+}$, and mixtures thereof.

In another subembodiment, M1 is selected from the group consisting of $Ti^{2+}$, $V^{2+}$, $Cr^{2+}$, $Mn^{2+}$, $Fe^{2+}$, $Co^{2+}$, $Ni^{2+}$, $Cu^{2+}$, $Mo^{2+}$, $Si^{2+}$, $Sn^{2+}$, $Pb^{2+}$, and mixtures thereof; M2 is selected from the group consisting of $Cu^{1+}$, $Ag^{1+}$, and mixtures thereof; and M3 is selected from the group consisting of $Sc^{3+}$, $Y^{3+}$, $B^{3+}$, $Al^{3+}$, $Ga^{3+}$, $In^{3+}$, and mixtures thereof. In another subembodiment, M1 and M3 are selected from their respective preceding groups, and M2 is selected from the group consisting of $Li^{1+}$, $K^{1+}$, $Na^{1+}$, $Ru^{1+}$, $Cs^{1+}$, and mixtures thereof.

In all embodiments described herein, moiety $XY_4$ is a polyanion selected from the group consisting of $X'[O_{4-x}Y'_x]$, $X'[O_{4-y},Y'_{2y}]$, $X''S_4$, $[X_z''',X'_{1-z}]O_4$, and mixtures thereof, wherein:

1. X' and X''' are each independently selected from the group consisting of P, As, Sb, Si, Ge, V, S, and mixtures thereof;
2. X'' is selected from the group consisting of P, As, Sb, Si, Ge, V, and mixtures thereof;
3. Y' is selected from the group consisting of a halogen, S, N, and mixtures thereof; and
4. $0 \leq x \leq 3$, $0 \leq y \leq 2$, and $0 \leq z \leq 1$.

In one embodiment, $XY_4$ is selected from the group consisting of $X'O_{4-x}Y'_x$, $X'O_{4-y}Y'_{2y}$, and mixtures thereof, and x and y are both 0 (x,y=0). Stated otherwise, $XY_4$ is a polyanion selected from the group consisting of $PO_4$, $SiO_4$, $GeO_4$, $VO_4$, $AsO_4$, $SbO_4$, $SO_4$, and mixtures thereof. Preferably, $XY_4$ is $PO_4$ (a phosphate group) or a mixture of $PO_4$ with another anion of the above-noted group (i.e., where X' is not P, Y' is not O, or both, as defined above). In one embodiment, $XY_4$ includes about 80% or more phosphate and up to about 20% of one or more of the above-noted anions.

In another embodiment, $XY_4$ is selected from the group consisting of $X'[O_{4-x},Y'_x]$, $X'[O_{4-y},Y'_{2y}]$, and mixtures thereof, and $0<x \leq 3$ and $0<y \leq 2$, wherein a portion of the oxygen (O) in the $XY_4$ moiety is substituted with a halogen, S, N, or a mixture thereof.

In all embodiments described herein, moiety Z (when provided) is selected from the group consisting of OH (Hydroxyl), a halogen, or mixtures thereof. In one embodiment, Z is selected from the group consisting of OH, F (Fluorine), Cl (Chlorine), Br (Bromine), and mixtures thereof. In another embodiment, Z is OH. In another embodiment, Z is F, or a mixture of F with OH, Cl, or Br. Where the moiety Z is incorporated into the active material of the present invention, the active material may not take on a NASICON structural. It is quite normal for the symmetry to be reduced with incorporation of, for example, one or more halogens.

The composition of the electrode active material, as well as the stoichiometric values of the elements of the composition, are selected so as to maintain electroneutrality of the electrode active material. The stoichiometric values of one or more elements of the composition may take on non-integer values. Preferably, the $XY_4$ moiety is, as a unit moiety, an anion having a charge of −2, −3, or −4, depending on the selection of X', X'', X''' Y', and x and y. When $XY_4$ is a mixture of polyanions such as the preferred phosphate/phosphate substitutes discussed above, the net charge on the $XY_4$ anion may take on non-integer values, depending on the charge and composition of the individual groups $XY_4$ in the mixture.

In one particular subembodiment, A of general formula (I) is Li, M is selected from the group consisting of $Ti^{3+}$, $V^{3+}$, $Cr^{3+}$, $Mn^{3+}$, $Fe^{3+}$, $Co^{3+}$, $Ni^{3+}$, $Mo^{3+}$, $Nb^{3+}$, and mixtures thereof (preferably $V^{3+}$), $XY_4=PO_4$, c=3, and e=0.

Methods of making the electrode active materials described by general formula (I), are described in: WO 01/54212 to Barker et al., published Jul. 26, 2001; International Publication No. WO 98/12761 to Barker et al., published Mar. 26, 1998; WO 00/01024 to Barker et al., published Jan. 6, 2000; WO 00/31812 to Barker et al., published Jun. 2, 2000; WO 00/57505 to Barker et al., published Sep. 28, 2000; WO 02/44084 to Barker et al., published Jun. 6, 2002; WO 03/085757 to Saidi et al., published Oct. 16, 2003; WO 03/085771 to Saidi et al., published Oct. 16, 2003; WO 03/088383 to Saidi et al., published Oct. 23, 2003; U.S. Pat. No. 6,528,033 to Barker et al., issued Mar. 4, 2003; U.S. Pat. No. 6,387,568 to Barker et al., issued May 14, 2002; U.S. Publication No. 2003/0027049 to Barker et al., published Feb. 2, 2003; U.S. Publication No. 2002/0192553 to Barker et al., published Dec. 19, 2002; U.S. Publication No. 2003/0170542 to Barker at al., published Sep. 11, 2003; and U.S. Publication No. 2003/1029492 to Barker et al., published Jul. 10, 2003; the teachings of all of which are incorporated herein by reference.

The following non-limiting examples illustrate the compositions and methods of the present invention.

EXAMPLES 18650 cylindrical electrochemical cells employing $Li_3V_2(PO_4)_3$ synthesized per the teachings herein, were constructed. Each cell was cycled at a rate of C/2 (10 A constant current) at 23° C. from 4.6V.

Figure 2:
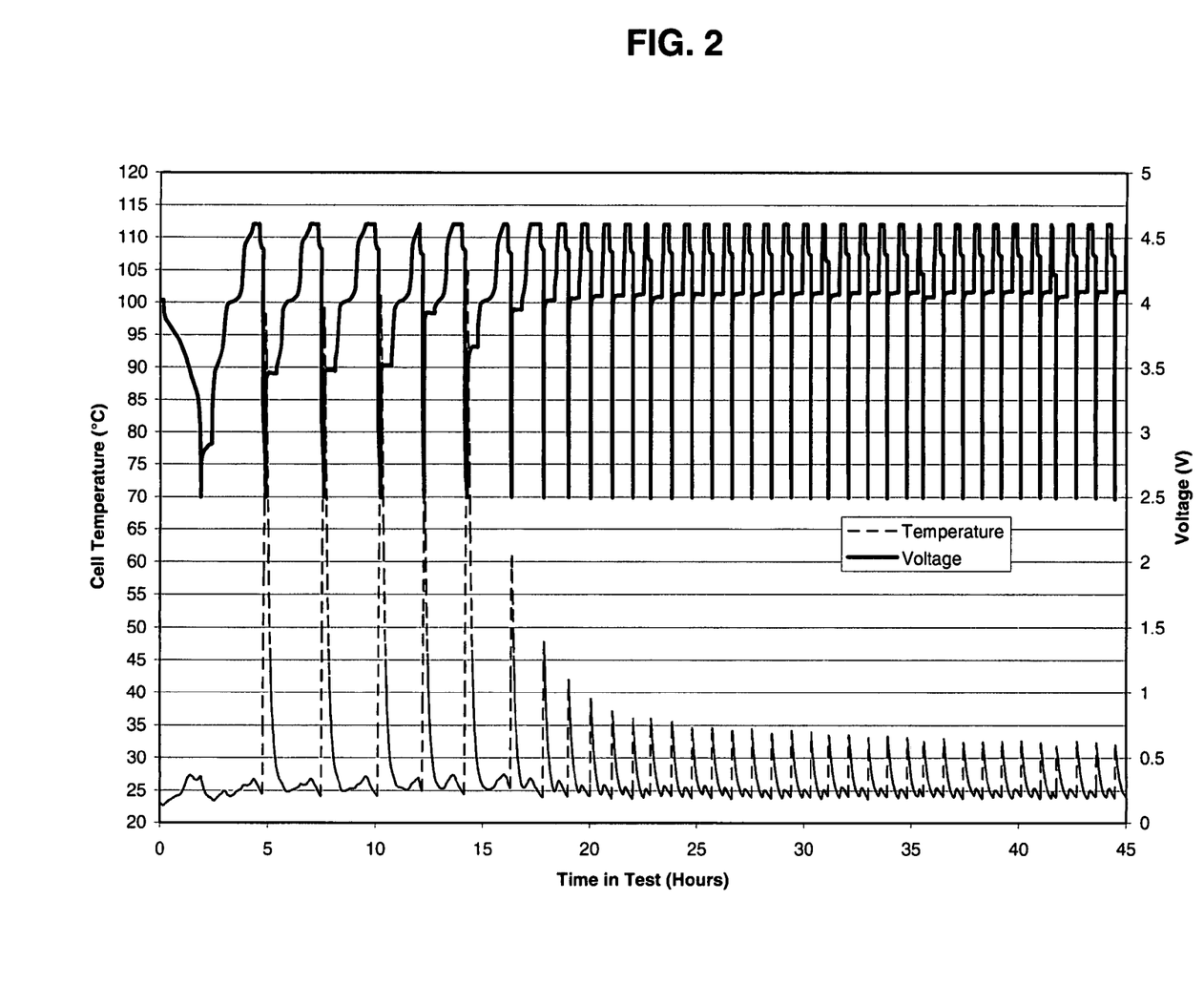
FIG. 2 is a plot of the internal temperature (° C.) and voltage (V) as a function of time (hr) for Cell 1.
Figure 3:
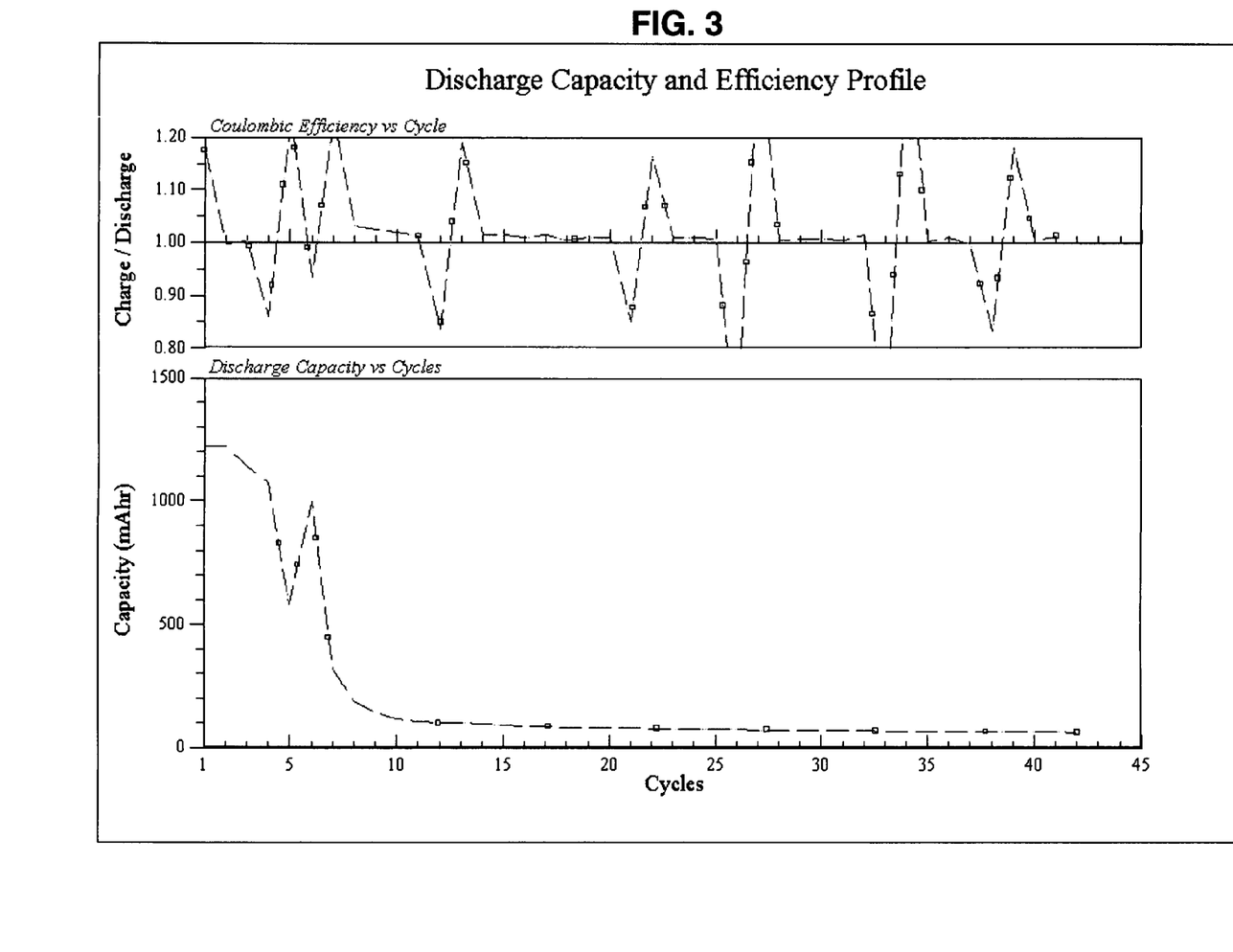
FIG. 3 is a plot of Coulombic efficiency and discharge capacity as a function of cycle number for Cell 1.
Figure 4:
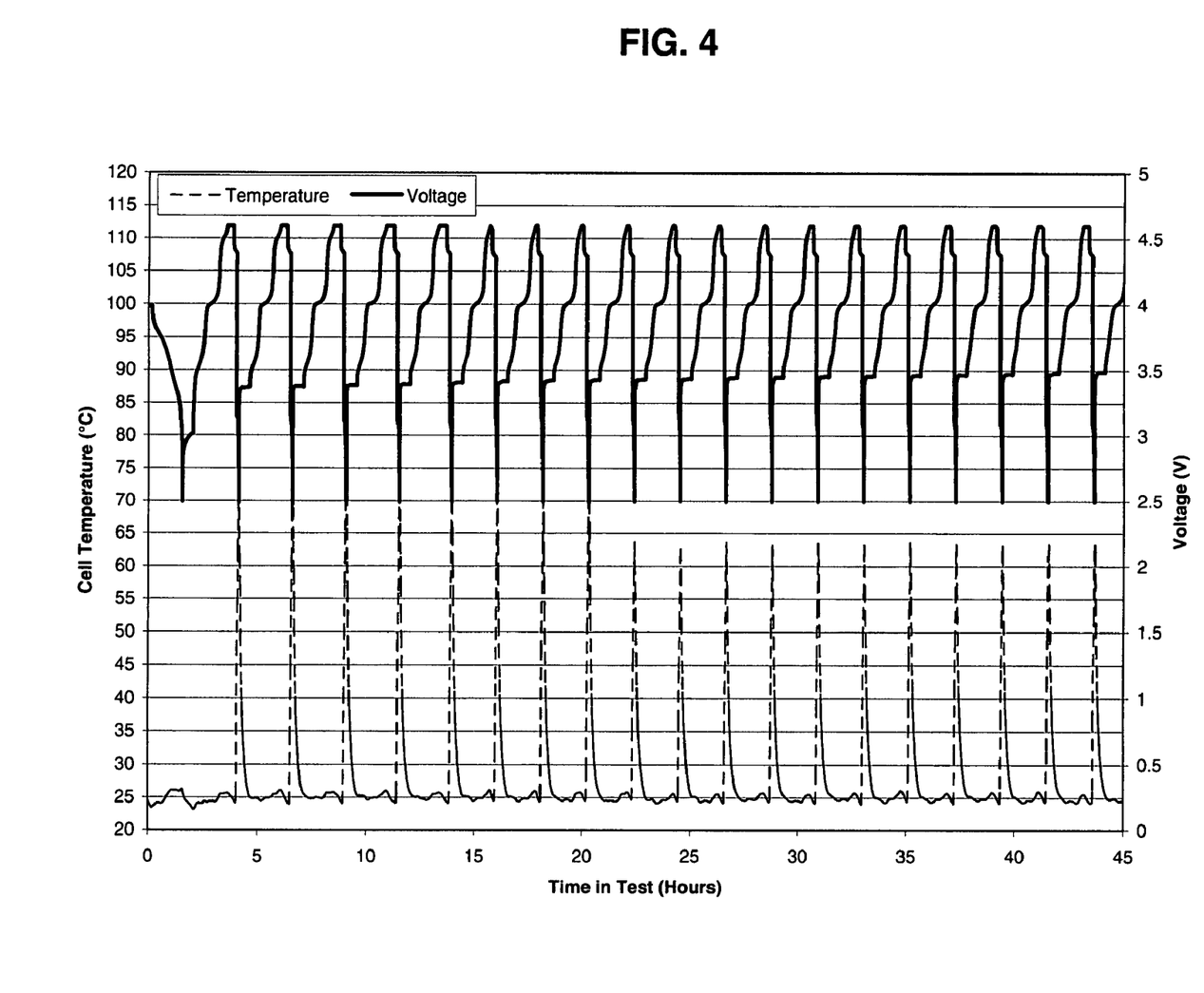
FIG. 4 is a plot of the internal temperature (° C.) and voltage (V) as a function of time (hr) for Cell 2.
Figure 5:
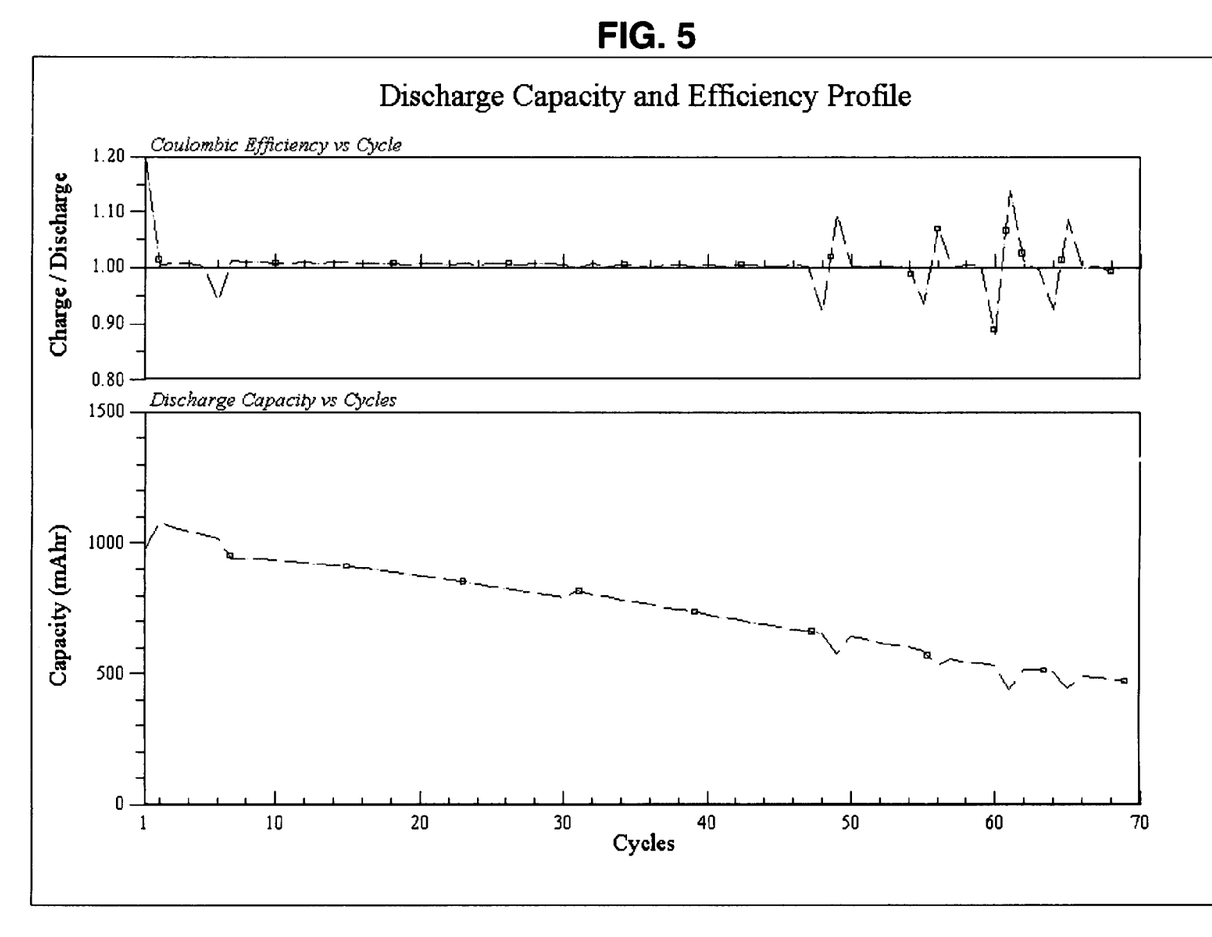
FIG. 5 is a plot of Coulombic efficiency and discharge capacity as a function of cycle number for Cell 2.

Referring to FIGS. 2 through 5, three cells were cycled without the benefit of a phase change-assisted passive heat sink. FIGS. 2 and 4 are plots of cell internal temperature (° C.) and voltage (V) as a function of time (hr) for Cells 1 and 2, respectively. FIGS. 3 and 5 are plots of Coulombic efficiency and discharge capacity as a function of cycle number for Cells 1, 2 and 3, respectively. The max temperature observed were 105° C. (Cell 1) and 75.1° C. (Cell 2). As FIGS. 3 and 5 indicate, each cell exhibited a sharp drop in capacity and poor Coulombic efficiency.

Figure 6:
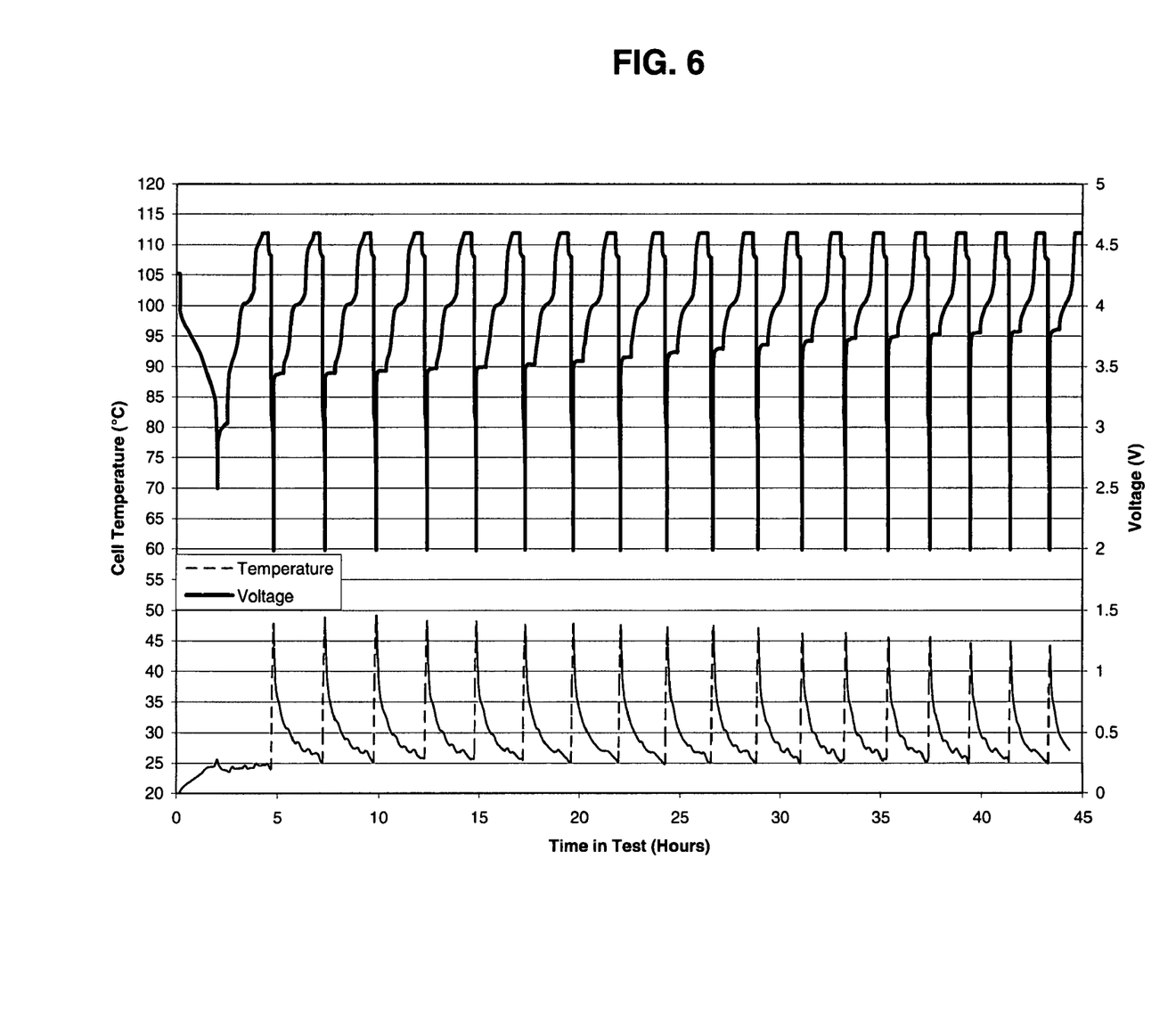
FIG. 6 is a plot of the internal temperature (° C.) and voltage (V) as a function of time (hr) for Cell 3.
Figure 7:
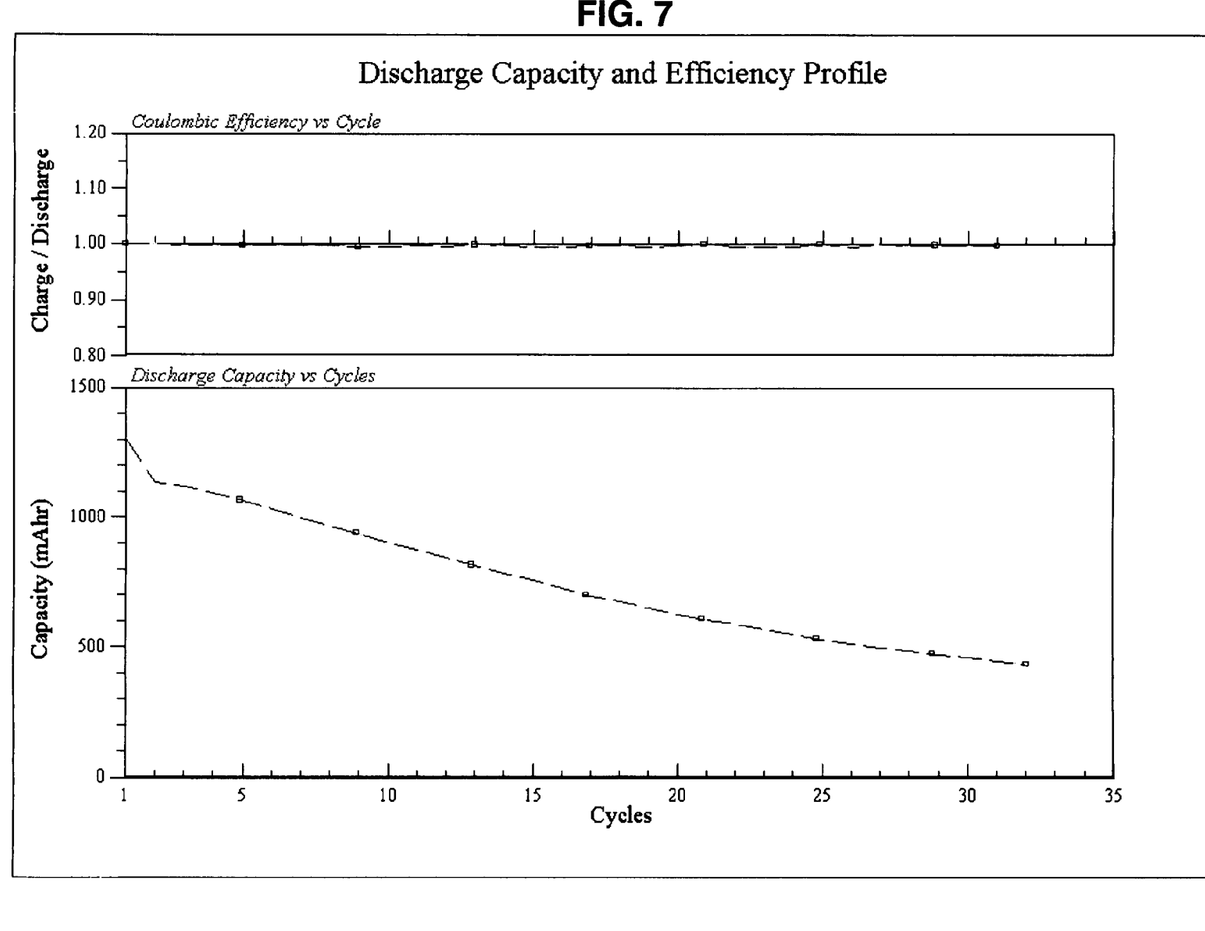
FIG. 7 is a plot of Coulombic efficiency and discharge capacity as a function of cycle number for Cell 3.
Figure 8:
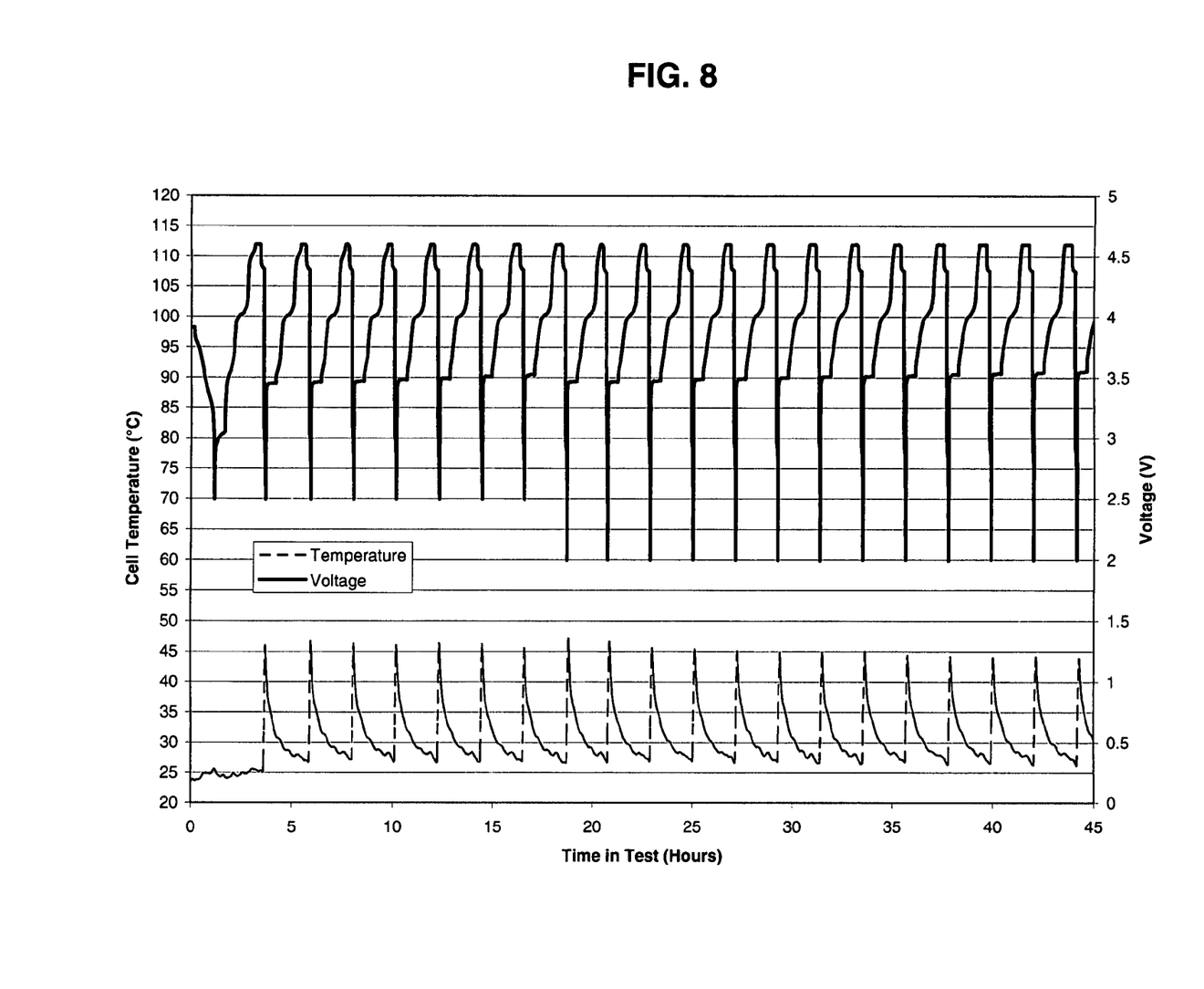
FIG. 8 is a plot of the internal temperature (° C.) and voltage (V) as a function of time (hr) for Cell 4.
Figure 9:
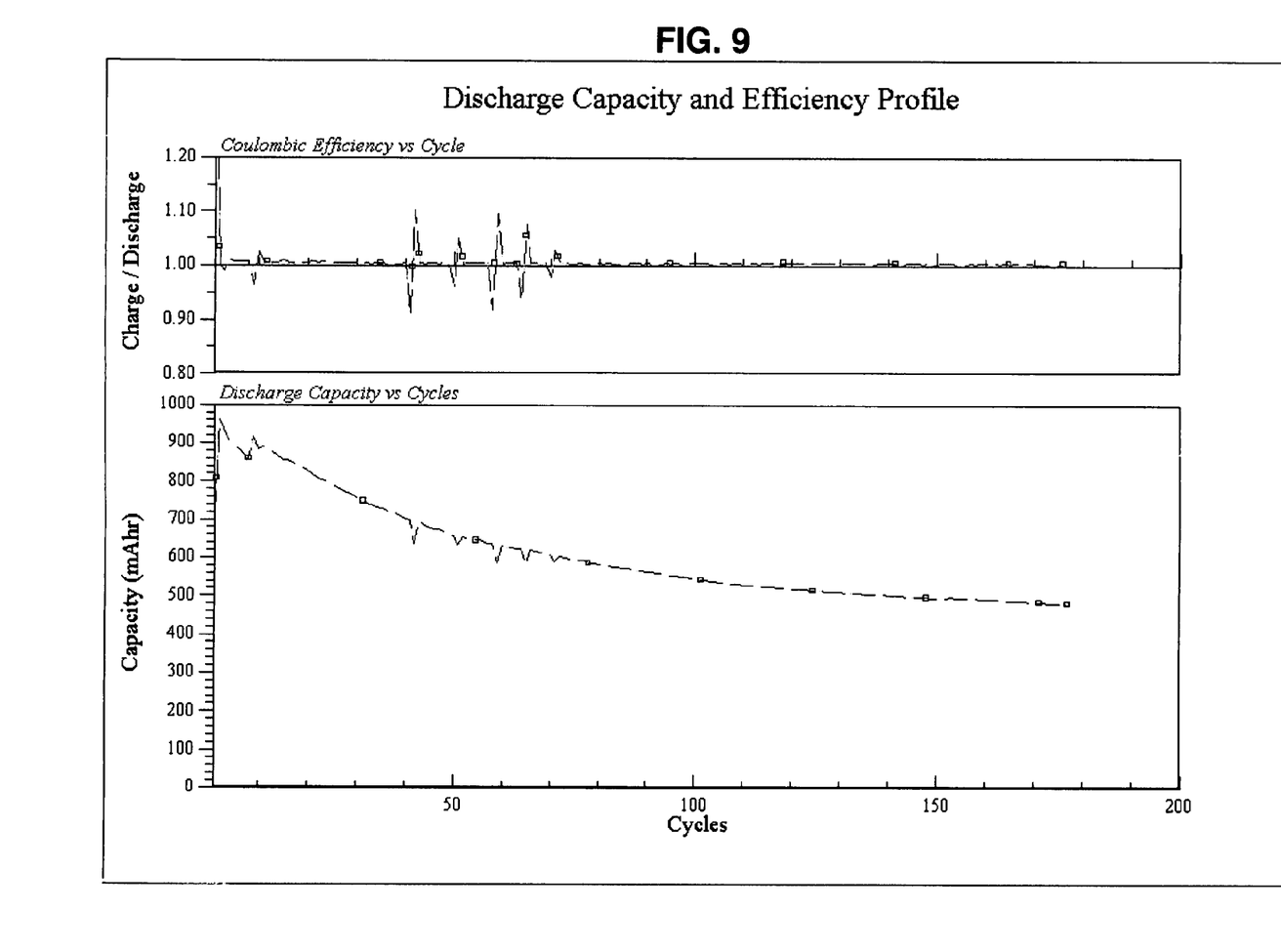
FIG. 9 is a plot of Coulombic efficiency and discharge capacity as a function of cycle number for Cell 4.

Referring to FIGS. 6 through 9, two cells (Cells 3 and 4) were encapsulated with Bayberry wax. FIGS. 6 and 8 are plots of cell internal temperature (° C.) and voltage (V) as a function of time (hr) for Cells 3 and 4 respectively. FIGS. 7 and 9 are plots of Coulombic efficiency and discharge capacity as a function of cycle number for Cells 3 and 4, respectively. The max temperature observed were 49.2° C.

(Cell 3) and 47.3° C. (Cell 4). As FIGS. 7 and 9 indicate, each cell exhibited a lesser drop in capacity (vs. Cells 1 and 2) and excellent Coulombic efficiency.

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A battery assembly, comprising:
a battery having a casing containing a positive electrode, a negative electrode comprising an intercalation active material, and an electrolyte in ion-transfer communication with the positive electrode and the negative electrode, the positive electrode comprising a compound represented by the general nominal formula:

$A_a M_m (XY_4)_c Z_e$, wherein:
a. A is selected from the group consisting of elements from Group I of the Periodic Table, and mixtures thereof, and $0 < a \leq 9$;
b. M includes at least one redox active element, and $1 \leq m \leq 3$;
c. $XY_4$ is selected from the group consisting of $X'[O_{4-x}, Y'_x]$, $X'[O_{4-y}, Y'_{2y}]$, $X''S_4$, $[X_z''', X'_{1-z}]O_4$, and mixtures thereof, wherein:
   i. X' and X''' are each independently selected from the group consisting of P, As, Sb, Si, Ge, V, S, and mixtures thereof;
   ii. X'' is selected from the group consisting of P, As, Sb, Si, Ge, V, and mixtures thereof;
   iii. Y' is selected from the group consisting of a halogen, S, N, and mixtures thereof; and
   iv. $0 \leq x \leq 3$, $0 \leq y \leq 2$, $0 \leq z \leq 1$ and $0 \leq c \leq 3$; and
d. Z is selected from the group consisting of a hydroxyl (OH), a halogen selected from Group 17 of the Periodic Table, and mixtures thereof, and $0 \leq e \leq 4$;
wherein A, M, X, Y, Z, a, m, x, y, z, c and e are selected so as to maintain electroneutrality of the compound;
the battery assembly further comprising a phase change-assisted passive heat sink in heat transfer relationship with the battery casing, wherein the phase change-assisted passive heat sink contains a thermally conductive filler.

2. The battery assembly of claim 1, wherein the phase change-assisted passive heat sink comprises a material selected from the group consisting of: $C_{12}$–$C_{16}$ alcohols, acids, and esters; waxes; low molecular weight styrenes; methyl triphenyl silane materials; and combinations thereof.

3. The battery assembly of claim 2, wherein the phase change-assisted passive heat sink comprises a material selected from the group consisting of myristyl alcohol, cetyl alcohol, stearyl alcohol, myristyl acid, and stearic acid.

4. The battery assembly of claim 2, wherein the phase change-assisted passive heat sink comprises a material selected from the group consisting of: highly- and semi-crystalline wax; paraffin waxes; uncrosslinked organofunctional silicone wax; cyclopentane; heceicosyl; 2-heptadecanone; pentacosaneyl; silicic acid, tetraphenyl ester; octadecanoic acid; 2-[2-[2-(2hydroxyethoxy) ethoxy] ethoxy]ethyl ester; cyclohexane, docosyl; polystyrene; polyamide resins; disiloxane 1,1,1, trimethyl-3,3; and triphenyl silane.

5. The battery assembly of claim 2, wherein the phase change-assisted passive heat sink further comprises an inorganic endothermic phase change material.

6. The battery assembly of claim 5, wherein the inorganic endothermic phase change material is selected from the group consisting of sodium thiosulfate pentahydrate; sodium acetate trihydrate; sodium sulfate decahydrate; sodium carbonate; barium hydroxide; calcium chloride; nickel nitrate tetrahydrate; zinc nitrate hexahydrate; and mixtures thereof.

7. The battery assembly of claim 1, wherein the phase change-assisted passive heat sink comprises an inorganic endothermic phase change material.

8. The battery assembly of claim 7, wherein the inorganic endothermic phase change material is selected from the group consisting of sodium thiosulfate pentahydrate; sodium acetate trihydrate; sodium sulfate decahydrate; sodium carbonate; barium hydroxide; calcium chloride; nickel nitrate tetrahydrate; zinc nitrate hexahydrate; and mixtures thereof.

9. The battery assembly of claim 1, wherein the thermally conductive filler is selected from the group consisting of aluminum nitride; aluminum oxide; barium titinate; beryllium oxide; boron nitride; diamond; graphite; magnesium oxide; copper; gold; nickel; silver; silicon carbide; tungsten carbide; zinc oxide; and combinations thereof.

10. The battery assembly of claim 9, wherein the phase change-assisted passive heat sink comprises a material selected from the group consisting of: $C_{12}$–$C_{16}$ alcohols, acids, and esters; waxes; low molecular weight styrenes; methyl triphenyl silane materials; and combinations thereof.

11. The battery assembly of claim 10, wherein the phase change-assisted passive heat sink comprises a material selected from the group consisting of myristyl alcohol, cetyl alcohol, stearyl alcohol, myristyl acid, and stearic acid.

12. The battery assembly of claim 10, wherein the phase change-assisted passive heat sink comprises a material selected from the group consisting of: highly- and semi-crystalline wax; paraffin waxes; uncrosslinked organofunctional silicone wax; cycliopentane; heceicosyl; 2-heptadecanone; pentacosaneyl; silicic acid, tetraphenyl ester; octadecanoic acid; 2-[2-[2-(2hydroxyethoxy) ethoxy] ethoxy]ethyl ester; cyclohexane, docosyl; polystyrene; polyamide resins; disiloxane 1,1,1, trimethyl-3,3; and triphenyl silane.

13. The battery assembly of claim 10, wherein the phase change-assisted passive heat sink further comprises an inorganic endothermic phase change material.

14. The battery assembly of claim 13, wherein the inorganic endothermic phase change material is selected from the group consisting of sodium thiosulfate pentahydrate; sodium acetate trihydrate; sodium sulfate decahydrate; sodium carbonate; barium hydroxide; calcium chloride; nickel nitrate tetrahydrate; zinc nitrate hexahydrate; and mixtures thereof.

15. The battery assembly of claim 9, wherein the phase change-assisted passive heat sink comprises an inorganic endothermic phase change material.

16. The battery assembly of claim 15, wherein the inorganic endothermic phase change material is selected from the group consisting of sodium thiosulfate pentahydrate; sodium acetate trihydrate; sodium sulfate decahydrate; sodium carbonate; barium hydroxide; calcium chloride; nickel nitrate tetrahydrate; zinc nitrate hexahydrate; and mixtures thereof.

17. The battery assembly of claim 1, wherein the phase change-assisted passive heat sink is encapsulated by a polymer material.

18. The battery assembly of claim 17, wherein the polymer material is selected from the group consisting of styrene butadiene rubbers, di-block elastomers, tri-block elastomers, nitriles, natural rubbers, polyester resins, and combinations thereof.

19. A battery assembly, comprising:
a battery having a casing containing a positive electrode, a negative electrode comprising an intercalation active material, and an electrolyte in ion-transfer communication with the positive electrode and the negative electrode, the positive electrode comprising a compound represented by the general nominal formula:

$A_a M_m (XY_4)_c Z_e$, wherein:
a. A is selected from the group consisting of elements from Group I of the Periodic Table, and mixtures thereof, and $0 \leq a \leq 9$;
b. M includes at least one redox active element, and $1 \leq m \leq 3$;
c. $XY_4$ is selected from the group consisting of $X'[O_{4-x}, Y'_x]$, $X'[O_{4-y}, Y'_{2y}]$, $X''S_4$, $[X_z''', X'_{1-z}]O_4$, and mixtures thereof, wherein:
  i. X' and X''' are each independently selected from the group consisting of P, As, Sb, Si, Ge, V, S, and mixtures thereof;
  ii. X'' is selected from the group consisting of P, As, Sb, Si, Ge, V, and mixtures thereof;
  iii. Y' is selected from the group consisting of a halogen, S, N, and mixtures thereof; and
  iv. $0 \leq x \leq 3$, $0 \leq y \leq 2$, $0 \leq z \leq 1$ and $0 \leq c \leq 3$; and
d. Z is selected from the group consisting of a hydroxyl (OH), a halogen selected from Group 17 of the Periodic Table, and mixtures thereof, and $0 \leq e \leq 4$;
wherein A, M, X, Y, Z, a, m, x, y, z, c and e are selected so as to maintain electroneutrality of the compound;
the battery assembly further comprising a phase change-assisted passive heat sink in heat transfer relationship with the battery casing, wherein the phase change-assisted passive heat sink is encapsulated by a polymer material.

20. The battery assembly of claim 19, wherein the phase change-assisted passive heat sink comprises a material selected from the group consisting of: $C_{12}$–$C_{16}$ alcohols, acids, and esters; waxes; low molecular weight styrenes; methyl triphenyl silane materials; and combinations thereof.

21. The battery assembly of claim 20, wherein the phase change-assisted passive heat sink comprises a material selected from the group consisting of myristyl alcohol, cetyl alcohol, stearyl alcohol, myristyl acid, and stearic acid.

22. The battery assembly of claim 20, wherein the phase change-assisted passive heat sink comprises a material selected from the group consisting of: highly- and semi-crystalline wax; paraffin waxes; uncrosslinked organofunctional silicone wax; cyclopentane; heceicosyl; 2-heptadecanone; pentacosaneyl; silicic acid, tetraphenyl ester; octadecanoic acid; 2-[2-[2-(2hydroxyethoxy) ethoxy] ethoxy]ethyl ester; cyclohexane, docosyl; polystyrene; polyamide resins; disiloxane 1,1,1, trimethyl-3,3; and triphenyl silane.

23. The battery assembly of claim 20, wherein the phase change-assisted passive heat sink further comprises an inorganic endothermic phase change material.

24. The battery assembly of claim 23, wherein the inorganic endothermic phase change material is selected from the group consisting of sodium thiosulfate pentahydrate; sodium acetate trihydrate; sodium sulfate decahydrate; sodium carbonate; barium hydroxide; calcium chloride; nickel nitrate tetrahydrate; zinc nitrate hexahydrate; and mixtures thereof.

25. The battery assembly of claim 19, wherein the phase change-assisted passive heat sink comprises an inorganic endothermic phase change material.

26. The battery assembly of claim 25, wherein the inorganic endothermic phase change material is selected from the group consisting of sodium thiosulfate pentahydrate; sodium acetate trihydrate; sodium sulfate decahydrate; sodium carbonate; barium hydroxide; calcium chloride; nickel nitrate tetrahydrate; zinc nitrate hexahydrate; and mixtures thereof.

27. The battery assembly of claim 19, wherein the polymer material is selected from the group consisting of styrene butadiene rubbers, di-block elastomers, tri-block elastomers, nitriles, natural rubbers, polyester resins, and combinations thereof.

28. The battery assembly of claim 27, wherein the phase change-assisted passive heat sink comprises a material selected from the group consisting of: $C_{12}$–$C_{16}$ alcohols, acids, and esters; waxes; low molecular weight styrenes; methyl triphenyl silane materials; and combinations thereof.

29. The battery assembly of claim 28, wherein the phase change-assisted passive heat sink comprises a material selected from the group consisting of myristyl alcohol, cetyl alcohol, stearyl alcohol, myristyl acid, and stearic acid.

30. The battery assembly of claim 28, wherein the phase change-assisted passive heat sink comprises a material selected from the group consisting of: highly- and semi-crystalline wax; paraffin waxes; uncrosslinked organofunctional silicone wax; cyclopentane; heceicosyl; 2-heptadecanone; pentacosaneyl; silicic acid, tetraphenyl ester; octadecanoic acid; 2-[2-[2-(2hydroxyethoxy) ethoxy] ethoxy]ethyl ester; cyclohexane, docosyl; polystyrene; polyamide resins; disiloxane 1,1,1, trimethyl-3,3; and triphenyl silane.

31. The battery assembly of claim 28, wherein the phase change-assisted passive heat sink further comprises an inorganic endothermic phase change material.

32. The battery assembly of claim 31, wherein the inorganic endothermic phase change material is selected from the group consisting of sodium thiosulfate pentahydrate; sodium acetate trihydrate; sodium sulfate decahydrate; sodium carbonate; barium hydroxide; calcium chloride; nickel nitrate tetrahydrate; zinc nitrate hexahydrate; and mixtures thereof.

33. The battery assembly of claim 27, wherein the phase change-assisted passive heat sink comprises an inorganic endothermic phase change material.

34. The battery assembly of claim 33, wherein the inorganic endothermic phase change material is selected from the group consisting of sodium thiosulfate pentahydrate; sodium acetate trihydrate; sodium sulfate decahydrate; sodium carbonate; barium hydroxide; calcium chloride; nickel nitrate tetrahydrate; zinc nitrate hexahydrate; and mixtures thereof.

35. The battery assembly of claim 19, wherein the phase change-assisted passive heat sink contains a thermally conductive filler.

36. The battery assembly of claim 35, wherein the thermally conductive filler is selected from the group consisting of aluminum nitride; aluminum oxide; barium titinate; beryllium oxide; boron nitride; diamond; graphite; magnesium oxide; copper; gold; nickel; silver; silicon carbide; tungsten carbide; zinc oxide; and combinations thereof.

* * * * *